Feb. 16, 1926.  
R. T. PIERCE  
1,572,949  
GRAPHIC METER CONTROL MECHANISM  
Filed July 11, 1922
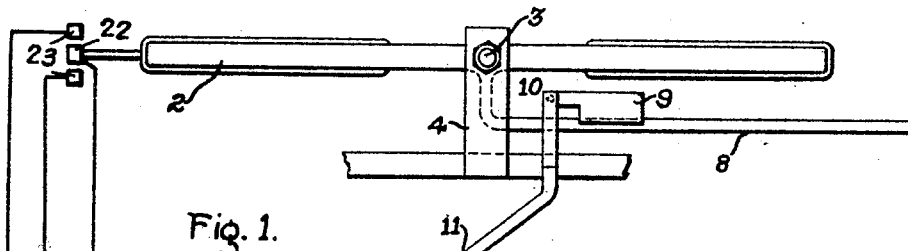
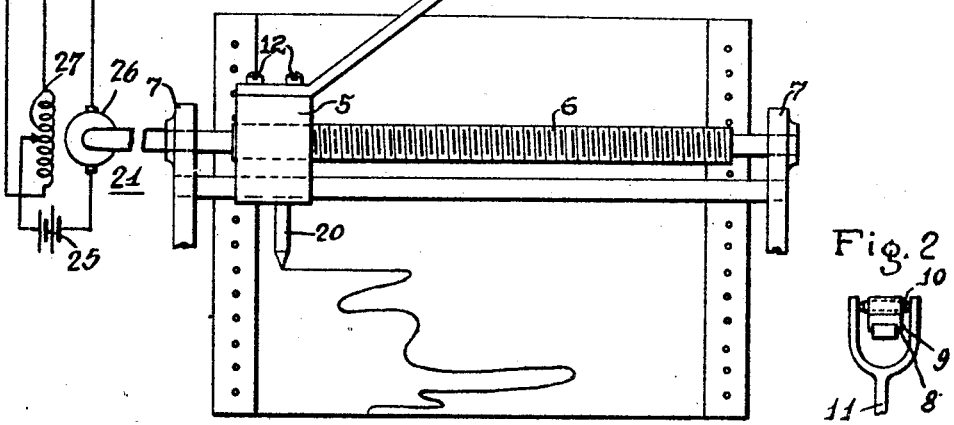
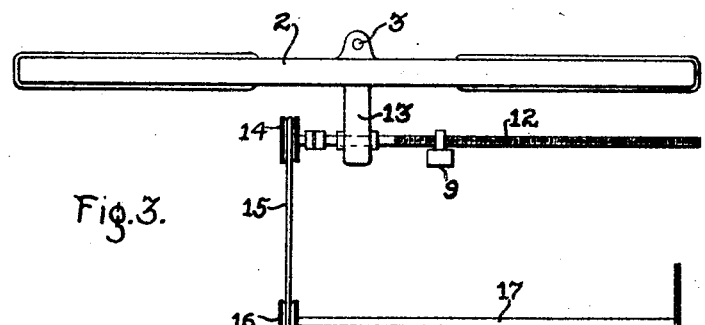
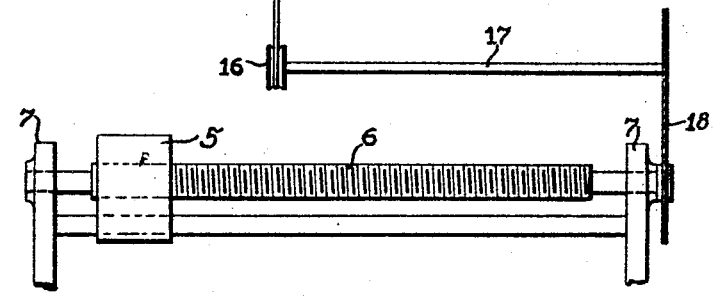
WITNESSES:  
R. J. Butler  
F. H. Miller
INVENTOR  
Raymond T. Pierce.  
BY  
Chesley G. Carr  
ATTORNEY Patented Feb. 16, 1926.

1,572,949

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

GRAPHIC-METER-CONTROL MECHANISM.

Application filed July 11, 1922. Serial No. 574,260.

To all whom it may concern:

Be it known that I, RAYMOND T. PIERCE, a citizen of the United States, and a resident of East Pittsburgh, in the county of Allegheny and State of Pennsylvania, have invented a new and useful Improvement in Graphic-Meter-Control Mechanisms, of which the following is a specification.

My invention relates to electrical measuring instruments and particularly to graphic-meter control mechanisms.

One object of my invention is to provide a graphic meter having a movable indicating member that shall be accurately responsive to its actuating influences over its entire range of movement.

Another object of my invention is to provide a device of the above-indicated character in which compensation shall be provided for the angular movement of a Kelvin balance relative to the rectilinear movement of an indicating pen or stylus member and in which movement of the movable member of the balance shall be opposed by proportionate amounts in accordance with the movement of the indicating member.

In my co-pending application, Serial No. 574,261, graphic-meter control mechanisms, filed July 11, 1922, to which reference may be had to assist in understanding my present invention, are set forth structures operative in accordance with the broad principle of compensating for the angular relative movement between a Kelvin balance and the pen or stylus carriage of a recording instrument.

In a usual form of relay-type recording instrument, as shown in Patent No. 1,289,503, for an electrical measuring instrument, issued December 31, 1918, to P. MacGahan, it has been customary to provide a Kelvin balance to control the operating pilot motor of the pen or stylus carriage which moves along a screw shaft. A pivoted cam-and-spring connection between the movable member of the Kelvin balance and the pen carriage, was provided to oppose movement of the balance in accordance with the movement of the pen.

In such an instrument, the force exerted by the spring against the balance was not varied in direct proportion to movement of the pen, over the entire range of movement of the latter, by reason of frictional wear in the cam-and-spring connection between the balance and the pen. Thus, errors occurred which rendered the instrument slightly inaccurate over a portion of its scale.

In practicing my present invention, I provide an instrument in which the parts are substantially free of such frictional wear and a weight member is so utilized to uniformly oppose the angular movement of the balance in accordance with the rectilinear movement of the pen carriage as to cause the latter to be more accurately responsive over its entire range of movement.

Figure 1 of the accompanying drawings is a view of a portion of a recording instrument embodying my invention;

Fig. 2 is a detail view of a portion of the structure shown in Fig. 1, taken at right angles thereto, and Fig. 3 is a view, similar to Fig. 1, of a modified form of my invention.

In the figures, in which similar parts are designated by similar reference characters, the movable or balanced member 2 of a Kelvin balance is pivotally mounted on a pin 3 that is supported on a bracket 4.

A traveling nut member or pen carriage 5, adapted to support a pen 20 or other indicating member, is mounted on a screw shaft 6 that is adapted to be rotated by a pilot motor 21 and is supported in bearing brackets 7.

In the structure shown in Fig. 1, an arm or lever 8 is mounted on, and is parallel to, the member 2 to turn therewith about the pin 3. A weight member 9 slidably mounted on the arm 8 is pivoted, by a pin 10, to an arm or connecting member 11 that extends to the nut 5 to which it is secured, as by screws 12.

The member 2 of the Kelvin balance is provided with a contact member 22 for engagement with stationary contact members 23 to control the movement of the pilot motor and, consequently, to control the movement of the shaft 6 and the nut 5 in accordance with the quantity being measured.

Engagement of the contact member 22 with one of the contact members 23 closes the circuit of a battery 25, or other source of electromotive force, through the armature 26 and, in one direction, through one half of the field winding 27 of the motor 21. Engagement of the contact member 22 with the other contact member 23 closes the circuit of the source 25 through the armature 26 and, in the opposite direction, through the other half of the field winding 27 of the motor 21. Thus, the motor 21 is operated in one direction or the other in accordance with movement of the member 2.

In operation, when the nut 5 travels to the right along the screw 6, the weight member 9 is correspondingly moved along the member 8 to thereby oppose counter-clockwise turning of member 2 in direct proportion to the amount of movement of the nut 5. Conversely, reverse movement of the nut 5 will move the weight member 9 toward the pivot pin 3 to lessen opposition to clockwise movement of the member 2 in accordance with the movement of the nut 5.

In the form of device shown in Fig. 3, a weight member 9, constituting a traveling nut, is mounted on a shaft 12 that extends parallel to the member 2. The shaft 12 is supported by an arm 13 on the member 2 and is connected to the shaft 6 by a pulley 14, a flexible member or belt 15, a pulley 16, a shaft 17 and gear members 18.

When the shaft 6 is rotated to move the nut 5, the shaft 12 will be correspondingly rotated to move the weight member 9. The latter moving relative to the pivot point of the member 2 will, as in the above-described form, oppose movement of the member 2 by proportionate increasing or decreasing amounts in accordance with the movement of the nut 5.

While I have shown and described particular forms of my invention, changes may be effected therein without departing from the spirit and scope thereof, as set forth in the appended claims.

I claim as my invention:

1. In an electrical measuring instrument, the combination with a rectilinearly movable indicating member and an independently angularly movable control member therefor, of means, including a weight member, for opposing forces caused by movement of the control member by proportionately varying forces in accordance with the direction and extent of movement of the indicating member.

2. In an electrical measuring instrument, the combination with a rectilinearly movable indicating member and a Kelvin balance for controlling the movement thereof, of means, including a weight member, connected between the indicating member and the Kelvin balance for opposing movement of the latter by proportionately varying amounts in accordance with the direction and extent of movement of the indicating member.

3. In an electrical measuring instrument, the combination with a screw shaft, a traveling nut on the shaft, an indicating member on the nut, a Kelvin balance energized in accordance with a circuit to be measured for controlling the operation of the screw shaft, of means, including a weight member, connected between the indicating member and the Kelvin balance for opposing movement of the latter by uniformly increasing or decreasing amounts in accordance with the direction and extent of movement of the indicating member.

4. In an electrical measuring instrument, the combination with a rectilinearly movable indicating member and an independent angularly movable control member therefor, of means, including a weight member, connected between said members and adapted to compensate for the angular relative movement thereof for opposing forces caused by movement of the control member by proportionately varying forces in accordance with the direction and extent of movement of the indicating member.

5. In an electrical measuring instrument, the combination with a rectilinearly-movable indicating member and an angularly-movable control member therefor, of means, including a weight member, connected between said members for compensating for the difference in the movements thereof and opposing forces caused by movement of the control member by proportionately varying forces in accordance with the direction and extent of movement of the indicating member.

6. In an electrical measuring instrument, the combination with a rectilinearly-movable indicating member and a Kelvin balance for controlling the movement thereof, of means including a lever-arm and a weight member movable therealong for opposing forces caused by movement of the balance by proportionately varying forces in accordance with the direction and extent of movement of the indicating member.

7. In an electrical measuring instrument, the combination with a rectilinearly-movable indicating member and a Kelvin balance for controlling the movement thereof, of means including a lever-arm mounted on the balance and a weight member movable therealong for opposing forces caused by movement of the balance by proportionately varying forces in accordance with the direction and extent of movement of the indicating member.

8. In an electrical measuring instrument, the combination with a rectilinearly-movable indicating member and a Kelvin balance for controlling the movement thereof, of means including a lever-arm projecting from the balance from a position adjacent to the pivot axis thereof, and a weight member movable along the arm for opposing forces caused by movement of the balance by proportionately varying forces in accordance with the direction and extent of movement of the indicating member.

In testimony whereof, I have hereunto subscribed my name this first day of July, 1922.

RAYMOND T. PIERCE.